United States Patent Office 3,282,910
Patented Nov. 1, 1966

3,282,910
MANUFACTURE OF CHLORINATED HIGH-PRESSURE POLYETHYLENES
Helmut Klug and Karl-Heinz Mittelberger, Gersthofen near Augsburg, Germany, assignors to Farbwerke Hoechst Aktiengesellschaft vormals Meister Lucius & Brüning, Frankfurt am Main, Germany, a corporation of Germany
No Drawing. Filed July 25, 1962, Ser. No. 212,434
11 Claims. (Cl. 260—94.9)

This invention is concerned with a process for the manufacture of chlorinated high-pressure polyethylenes having rubber elastic properties and an improved solubility, wherein a dispersion of a finely divided, solid material being inert to the chlorination reaction and a fine-grained high-pressure polyethylene having a molecular weight of at least 10,000 in an aqueous medium, is contacted with gaseous chlorine at a temperature of at least 70° C.

This application is a continuation-in-part application of co-pending patent application Serial Number 817,463, filed June 2, 1959, now abandoned by Helmut Klug et al. for "Manufacture of Chlorinated High-Pressure Polyethylene."

High-pressure polyethylenes differ from low-pressure polyethylenes in that the former have a more or less pronounced chain ramification, possess a considerably better solubility in organic solvents, and have a density of less than 0.955, especially 0.92 ±0.005. Moreover, high-pressure polyethylenes often have a substantially lower molecular weight and a less pronounced crystallinity than low-pressure polymers. It is known that low-pressure polyethylenes very often contain, at room temperature, a crystalline portion of more than 70%, i.e. up to 90% and more, while commercial high-pressure polyethylene contains only about 60% of crystalline constitutents, which can be further reduced by heating at about 70° C. On heating high-pressure polyethylene at a temperature of about 115° C., the entire molecule combination breaks down with formation of a uniform, viscous melt. In other words, the ratio of amorphous to crystalline constituents shifts substantially and progresses steadily at a temperature above 70° C. in favor of the amorphous constituents. These phenomena also exert an essential influence on chlorination reactions which are carried out at or above 70° C.

We have now found that chlorination products having especially valuable properties can be obtained from fine-grained high-pressure polyethylenes, the individual grains of which have preponderantly a size of at least 5, preferably 10μ and at most about 1,000μ. To achieve this, the fine-grained high-pressure polyethylene together with a fine-grained solid material being inert against the chlorination reaction is suspended in water and the resulting suspension is chlorinated while maintaining the reaction temperature, if possible from the very beginning of the reaction, at about 70° C. In view of the fact that the conversion temperature from the crystalline to the amorphous state of a chlorinated polyethylene increases as does the chlorine content, it is advantageous to prepare chlorination products containing a higher amount of bound chlorine, e.g. more than 42% chlorine at a still higher temperature, e.g. above 100 or preferably even above 110° C. The preferred maximum temperature is about 150° C., but advantageously not higher than about 130° C. A temperature higher than indicated above may also be used, but in this case the difficulties pertaining to apparatus must be taken into account.

In carrying out the process on an industrial scale, it is preferred to admix the batch with chlorine as it is absorbed in order to fairly utilize the chlorine. It is very advantageous, especially when the reaction is carried out at a temperature above 100° C., to force the chlorine into the closed apparatus. In this case, the chlorine is under a superatmospheric pressure in the range of between 0 and 20 or more atmospheres, for example.

Under certain circumstances, a temperature of more than 100° C. can be reached by carrying out the reaction in the presence of an electrolyte in order to increase the boiling point of the aqueous reaction mixture, such as an acid and/or a salt, for example calcium chloride, hydrochloric acid, phosphoric acid, sodium sulfate, sodium chloride, if desired with the application of superatmospheric pressure. It is obvious from the fact that the salt or acid is added in order to increase the boiling point of the aqueous phase, the chemical character of the additive is of no importance and hence every acid or salt which is able to increase the boiling point of an aqueous phase can be used. It is also possible to produce an appropriate superpressure by partially throttling the current of issuing gas leaving the apparatus. Any lump formation which would have been expected to occur under the reaction conditions selected, can be avoided by stirring the polyethylene suspension intensely.

It is one of the characteristic features of the present invention that the polyethylene is chlorinated in the presence of a finely divided solid material being inert under the conditions of the reaction. By the addition of such a material which may be used in an amount as small as 1% or even less enables a chlorination temperature above the agglomeration temperature of the polyethylene. As a consequence of the increased reaction temperature chlorination products of unexpected properties are obtained which are distinguished especially by their improved mechanical behaviour, e.g. their elongation at break under a defined tensile strength (tested according to German Standard DIN 53.504), Defo hardness (tested according to German Standard DIN 53.514), Shore-hardness (tested according to German Standard DIN 53.505) and shear strength (tested according to German Standard DIN 53.523 and DIN 53.524). Moreover, a polyvinyl chloride containing said chlorination product as a plasticizer, shows a considerably improved notch bar impact strength.

As finely divided solid material to be added to the polyethylene before the chlorination there may be mentioned, for example inorganic materials such as silicic acid or kieselguhr, barium sulfate, asbestos in powder form, titanium dioxide, graphite, carbon black, silicium carbide, antimony pentasulfide, antimony oxychloride or glass powder. Likewise organic materials may be used as far as they are solid under the reaction conditions and inert to the chlorination reaction. Examples for such materials are highly chlorinated, high melting substances such as perfluoroalkanes having a melting point above 150° C., octachloro-phenylene dioxide, decachloro-diphenyl, poly - tetrafluoro - ethylene, polytrifluorochloroethylene.

The particle size of the finely divided solid material is, like that of the polyethylene, in the range between 5μ and 1000μ, preferably larger than 10μ.

The amount of the finely divided solid material should range between 1 and 50% by weight, calculated on the polyethylene.

In order to distribute fairly homogeneously the product to be chlorinated on the finely divided solid material, the polyethylene may also be applied to that material with the aid of a selective solvent, such as white spirit, benzene, toluene, xylene or tetrahydronaphthalene.

The individual particles coagulate so as to yield almost exclusively grains which are so desired for filtration and have a diameter substantially larger than has the starting material. These grains can be dried without difficulty after having been separated from the mother liquor and repeatedly washed, if desired, with the addition of a stabilizer.

The reaction of this invention may also be carried out with advantage in the presence of an emulsifier and/or under catalytic influence. The term "catalytic influence" as used herein includes, for example, the action of luminous energy, for example light rich in ultraviolet rays and/or the presence of an agent forming radicals. As the radical forming agent there may be mentioned more especially: peroxides, such as benzoyl peroxide, toluyl peroxide, chlorobenzoyl peroxide, lauroyl peroxide, cyclohexanone peroxide; furthermore, azonitriles, such as azodiiosbutyronitrile. Suitable emulsifiers are, for example: alkylaryl sulfonates or alkyl sulfonates; addition products of ethylene oxide and/or propylene oxide to alcohols, amines, carboxylic acids or phenols, or the sulfonation products thereof.

The process of this invention can be carried out with advantage using polyethylenes having molecular weights above about 10,000 up to, for example, 50,000. The reaction can be carried out the better the higher the molecular weight of the polyethylene used. The preferred polyethylenes have a molecular weight of between about 15,000 and 35,000. The limitation of the molecular weight to 50,000 is merely a consequence of the technical possibilities so far offered, but is of no importance to the workability of the invention, which enables chlorination products containing up to 70% by weight or more chlorine to be produced, the chlorination being generally conducted to a chlorine content of at least 10% by weight.

The properties of the products obtained depend substantially on the amount of chlorine incorporated. Contrary to products which have been chlorinated at a temperature below the conversion temperature referred to above, preparations containing 25–45% chlorine have distinct elastic properties, so that they are especially suitable for use as synthetic rubber and for making valuable combination products with other plastic materials. Similarly, products containing 55–65% chlorine which have been prepared by this invention are substantially superior as regards solubility to materials that have been chlorinated below 65° C. In contrast to high-pressure polyethylenes chlorinated at a temperature below 65° C., the products of this invention are well soluble at room temperature in trichloroethylene, butyl acetate or toluene leaving as a residue only the solid carrier material which, if desired, can be separated from the solution, e.g. by filtration.

The following examples serve to illustrate the invention, but they are not intended to limit it thereto:

Example 1

200 grams of a high-pressure polyethylene of a molecular weight of about 30,000 were dispersed—while adding two drops of Dodigen (Dodigen is a 50% aqueous solution of quaternary alkyl-dimethylbenzylamino-chloride, in which the alkyl groups represent natural coconut oil residues) and 6 grams of Tonsil (Tonsil is an activated bleaching earth)—in 2.5 kgs. of a calcium chloride solution of 30% strength and, while vigorously stirring, a slow chlorine stream was introduced into the dispersion at a temperature of 107–108° C. (internal temperature of the reactor). After a reaction time of 30 hours the reaction was discontinued, the obtained fine-grained product was filtered off with suction, purified by boiling with water and then dried at 60° C. The chlorinated polyethylene obtained had a chlorine content of 14.1%.

Example 2

100 grams of the high-pressure polyethylene used in Example 1 were dispersed in three liters of a calcium chloride solution of 30% strength while adding two drops of Dodigen and 3 grams of Tonsil and, at a temperature of 105–107° C. (internal temperature of the reactor), while vigorously stirring, an excess of chlorine gas was introduced. After 20 hours the reaction was discontinued and the product obtained was processed as indicated in Example 1. The resulting fine-grained polyethylene had a chlorine content of 26.5%.

Example 3

The chlorination was carried through as shown in Example 2, the reaction time being increased, however, to 23 hours. The product obtained had a chlorine content of 31.8%.

Example 4

The chlorination was carried through as stated in Example 3, the chlorine being introduced, however, in so strong a stream, that a great part of the chlorine escaped without undergoing a reaction. The obtained chlorinated polyethylene contained after 23 hours about 45% of bound chlorine.

Example 5

50 grams of the high-pressure polyethylene used in Example 1 were dispersed in 1.5 liters of hydrochloric acid of 20% strength while adding two drops of dodecylphenol, reacted with the 9–10 fold molar amount of ethylene oxide, and 2.5 grams of titanium dioxide. Into this mixture was entered under vigorous stirring and at an internal temperature of 106–107° C. an excess of chlorine gas. After a reaction time of 18 hours the coarse-grained product (grain diameter about 2–4 millimeters) containing 20% of bound chlorine was processed as stated in Example 1.

Example 6

50 grams of the high-pressure polyethylene used in Example 1 were dispersed in 1.5 liters of hydrochloric acid of 20% strength while adding one drop of a reaction product obtained from 1 mol of spermacidamine and 16 mols of ethylene oxide, and 25 grams of barium sulfate powder. While vigorously stirring an excess of chlorine gas was then entered at an internal temperature of 107° C. After 13 hours the reaction was discontinued and the chlorinated polyethylene was processed as described in Example 1. The coarse-grained product contained 11.5% of bound chlorine which corresponds to a chlorine content of about 16 to 16.5% calculated on the chlorinated polyethylene, as the product contains practically the whole amount of the added barium sulfate.

Example 7

1000 grams of the high-pressure polyethylene used in Example 1 were dispersed in 30 liters of water in an enamel 40-liters-boiler while adding 1 milliliter of Dodigen and 50 grams of carbon black (type Duvex 0). At an internal temperature of 105° C. chlorine was slowly introduced so that the internal pressure did not exceed 3.7 atmospheres. Simultaneously the heating was shut off, while the internal temperature rose to 109.5° C. due to the exothermic reaction. Within 90 minutes a total amount of 750 grams of chlorine were introduced and then the solution was stirred until being cool. The fine-grained granulate was filtered off with suction, boiled and dried as described in Example 1. The product obtained contained 25.8% of bound chlorine.

Example 8

1000 grams of the high-pressure polyethylene used in Example 1 were dispersed in 30 liters of water in an enamel 40-liters-boiler while adding 0.5 milliliter of Dodigen and 50 grams of carbon black (type Duvex O). At an internal temperature rising from 112 to 117° C. the chlorination was performed in 45 minutes. The chlorine content of the obtained fine-grained granulate amounted to 21.1%.

Example 9

1000 grams of the high-pressure polyethylene used in Example 1 were dispersed in 30 liters of water in an enamel 40-liters-boiler while adding 1 milliliter of Dodigen and 100 grams of carbon black (type Duvex O). While vigorously stirring as much chlorine was introduced at a temperature of 115° C. that the internal pressure did not exceed 3.2 atmospheres before the exothermic reaction set in. Before, the heating was shut off. The beginning exothermic reaction increased the internal temperature to 118° C. and, on further entering chlorine, the temperature rose to 121° C. Altogether 750 grams of chlorine gas were entered within 80 minutes in the course of which the internal pressure reached a maximum of 4.2 atms. The fine-grained granulate was filtered off with suction, boiled with water, washed and dried at a temperature of 60° C. under an air stream. This product contained 24.6% of bound chlorine.

Example 10

Process as described in Example 9 while introducing, however, 1000 grams of chlorine gas. The chlorine content of the resulting chlorinated polyethylene amounted to 29.8%.

Example 11

Process as described in Example 9 while entering, however, 1250 grams of chlorine gas within 100 minutes, in the course of which the internal pressure did not rise beyond 4.5 atmospheres. The obtained fine-grained granulate contained 31.3% of bound chlorine; this percentage corresponds to a chlorine content of about 33.5% calculated on the chlorinated polyethylene which further contains the added carbon black.

Example 12

50 grams of the high-pressure polyethylene used in Example 1 were dispersed in 1.5 liters of hydrochloric acid of 20% strength while adding a little of stearylamine as emulsifier and one gram of carbon black (type Corax 6). While vigorously stirring a slow chlorine stream was entered into the dispersion at an internal temperature of 108° C. After 24 hours the reaction was discontinued and the fine-grained product was filtered off with suction, purified and dried as shown in Example 1. The chlorinated polyethylene thus obtained contained 13.2% of bound chlorine.

Example 13

1000 grams of the high-pressure polyethylene used in Example 1 were dispersed in 30 liters of water in an enamel 40-liters-boiler while adding 1 milliliter of Dodigen and 100 grams of carbon black (type Corax 6). While stirring vigorously, at an internal temperature of 103° C., chlorine was introduced. Before, the heating was shut off. The beginning exothermic reaction quickly raised the temperature to 108° C. and, on further introduction of chlorine, the temperature reached 112° C. Altogether 750 grams of chlorine gas were introduced within 45 minutes, the internal pressure did not exceed 4.7 atmospheres. The solution was stirred until being cool. The very fine-grained almost pulverulent product was filtered off with suction, boiled with water, washed and dried at a temperature of 60° C. under an air stream. The chlorine content amounted to 19.4%.

Example 14

Batch and process as described in Example 13 using, however, 70 grams of carbon black and applying an internal temperature of 105° C. The beginning exothermic reaction quickly raised the temperature to 111° C. and, on further introduction of chlorine, the temperature reached 114° C. as a maximum. The obtained very fine-grained almost pulverulent product contained 23.3% of bound chlorine.

Example 15

Batch and process as described in Example 13 using, however, 50 grams of carbon black. The chlorination was carried through in the same way as in that example but in a reaction period of 150 minutes at an internal temperature of 106° C. The obtained coarse-grained granulate contained 24.6% of bound chlorine.

Example 16

Batch and process as described in Example 12 while using, however, instead of stearylamine, two drops of dodecylphenol reacted with the 9–10 fold molar amount of ethylene oxide as emulsifier. Under vigorous stirring a strong chlorine stream was introduced at an internal temperature of 106° C. so that always excessive chlorine was prevailing. After 18 hours the obtained fine-grained granulate contained 26.3% of bound chlorine.

Example 17

Batch and process as described in Example 14. While vigorously stirring gaseous chlorine was introduced at an internal temperature of 112° C., which quickly rose to 116° C. due to the quick onset of the exothermic reaction and reached finally 119° C. Within 60 minutes 750 grams of chlorine were introduced, the internal pressure amounting to 5.5 atmospheres as a maximum. The fine-grained granulate obtained contained 18.5% of bound chlorine.

Example 18

Batch and process as described in Example 17, beginning, however at an internal temperature of 114° C. In the course of the chlorination the temperature quickly increased to 121° C. and was kept constant at 124–124.5° C. A product was obtained containing 14.7% of chlorine.

Example 19

Batch and process as described in Example 17, however beginning at an internal temperature of 118° C. In the course of the chlorination the temperature rapidly rose to 126° C. and reached finally 129.5° C. The obtained fine-grained granulate contained 12.5% of bound chlorine.

Example 20

50 grams of the high-pressure polyethylene used in Example 1 were dispersed in 0.5 liter of a calcium chloride solution of 50% strength while adding 1 drops of dodecylphenol reacted with the 9–10 fold molar amount of ethylene oxide, and 5 grams of colloidal silicic acid and, at an internal temperature of 110° C., a slow chlorine stream was introduced. The dispersion became almost limpid, since the partly molten polyethylene particles formed little transparent balls which, in case of intense stirring, did not agglutinate. In the absence of an appropriate, if possible, inert substance, in this case colloidal silicic acid rapidly agglomeration occurs.

After 24 hours the reaction was discontinued and the chlorinated polyethylene was processed at a temperature of 60° C. by filtering off with suction, washing with water and drying. The product obtained, i.e. little, transparent balls (diameter about 1 millimeter), contained 11.5% of bound chlorine.

Example 21

50 grams of the high-pressure polyethylene used in Example 1 were dispersed in 1.5 liters of hydrochloric acid of 20% strength while adding a little of stearylamine as emulsifier and 5 grams of colloidal silicic acid. Under stirring a vigorous chlorine stream was introduced, so that the chlorine was always present in excess. The internal temperature amounted to 106–107° C. After a reaction time of 16 hours the obtained granulate contained 17% of bound chlorine.

Example 22

350 grams of the high-pressure polyethylene used in Example 1 were dispersed in 4 kilograms of a calcium chloride solution of 50% strength while adding two drops of dodecylphenol reacted with the 9–10 fold molar amount of ethylene oxide, and 3.5 grams of colloidal silicic acid. Under vigorous stirring a slow stream of chlorine gas was introduced at an internal temperature of 109–110° C. After a reaction time of 50 hours the product obtained was processed as described in Example 20. The chlorinated polyethylene was obtained in small, transparent little balls as described in Example 20. The chlorine content amounted to 20.7%.

*Example 23*

Batch and process as described in Example 20 adding, however, only 0.5 gram of colloidal silicic acid. The chlorination was carried through in the same way as was shown in Example 20. The chlorine was introduced, however, in such an amount that it was always present in excess. The reaction was also discontinued after 24 hours and the product was processed in the same way. The chlorinated polyethylene resulted to be transparent, elastic little balls which, after being dried, agglutinated, and contained 25.7% of bound chlorine.

*Example 24*

Batch and process as described in Example 22 using, however, two drops of Dodigen as emulsifier. The chlorination was carried through as shown in Example 22, however, in a reaction time of 100 hours. The chlorine content of the product (the product being of similar appearance as described in Example 23) amounted to 29.5%.

*Example 25*

1500 grams of the high-pressure polyethylene were dispersed in 30 liters of a calcium chloride solution of 50% strength in an enamel 40-liters-boiler while adding 1 milliliter of Dodigen and 50 grams of colloidal silicic acid. While vigorously stirring gaseous chlorine was introduced at an internal temperature of 110° C. so that the internal pressure reached a maximum of 4.8 atmospheres. The heating being shut off, the internal temperature due to the exothermic reaction rose only up to 113° C. In the course of the reaction altogether 1200 grams of chlorine gas were introduced in a period of 150 minutes.

While still being warm, water was added and the chlorinated polyethylene was filtered off with suction, boiled with water, washed and dried at 60° C. under an air stream. The elastic product, which agglutinated after being dried and which consisted of little, transparent balls (diameter about 1 millimeter), contained 23.7% of bound chlorine.

*Example 26*

1000 grams of the high-pressure polyethylene used in Example 1 were dispersed in 30 liters of water in an enamel 40-liters-boiler while adding 1 milliliter of Dodigen and 50 grams of antimony pentasulfide.[1] While stirring vigorously chlorine was introduced at an internal temperature of 102° C. Due to the onset of the exothermic reaction the temperature rose quickly up to 105° C. and, finally, to 110° C. Within 60 minutes altogether 750 grams of chlorine were introduced, the internal pressure amounting to a maximum of 4 atmospheres. The product was stirred until being cool, the colorless, elastic, fine-grained granulate was filtered off with suction, boiled with water and washed and finally dried at 60° C. under an air stream. The chlorine content amounted to 23.1%.

*Example 27*

Batch and process as described in Example 26, the initial temperature, however, being 108° C., which rose rapidly up to 111° C. and reached finally 114° C. The product obtained had a chlorine content of 23.5%.

*Example 28*

Batch and process as described in Example 26 introducing, however, 1000 grams of chlorine in the course of 75 minutes. The obtained fine-grained, elastic granulate contained 27.0% of bound chlorine.

*Example 29*

Batch and process as described in Example 27 introducing, however, 1200 grams of chlorine. The product obtained had a chlorine content of 33.8%.

*Example 30*

Batch and process as described in Example 26, introducing, however, 1500 grams of chlorine in the course of 90 minutes. The obtained fine-grained elastic granulate contained 39.0% of bound chlorine.

*Example 31*

Batch and process as described in Example 27 introducing, however, altogether 1500 grams of chlorine. The chlorinated polyethylene obtained had a chlorine content of 39.2%.

*Example 32*

Batch and process as described in Example 26 introducing, however, 1800 grams of chlorine in the course of 135 minutes. The obtained fine-grained, elastic granulate contained 44.2% of bound chlorine.

*Example 33*

100 grams of the high-pressure polyethylene used in Example 1 were dispersed in 3600 grams of a calcium chloride solution of 30% strength while adding one drop of Dodigen and 5 grams of 2,5-diphenoxy-3,6-dichloro-p-chinone. Under stirring a slow chlorine stream was introduced at an internal temperature of 106–107° C. After 96 hours the reaction was discontinued, the fine-grained, yellow, elastic granulate was filtered off with suction, boiled with water, washed and dried at 60° C.

*Example 34*

200 grams of the polyethylene used in the previous examples were suspended in 2.5 kilograms of an aqueous calcium chloride solution of 30% strength while adding 30 grams of asbestos powder (short-fibered) and two drops of a concentrated aqueous solution of a quarternary emulsifier (prepared from dimethylated coconut oil amine and benzylchloride). Under intense stirirng gaseous chlorine was introduced at 105–107° C. After a chlorination time of 40 hours the reaction was discontinued, the fine-grained chlorination product obtained in the form of transparent caoutchouc-elastic, little balls was filtered off with suction, boiled, washed with water and dried at 60° C. The chlorine content amounted to 19%.

*Examination of the mechanical properties of some products obtained according to the preceding examples*

Sheets were made by rolling 100 grams of chlorinated polyethylene with two grams of magnesium stearate as lubricant and stabilizer. The sheets were rolled 5 to 10 minutes at a temperature ranging between 20 and 120° C. depending on the kind of the chlorinated polyethylene. From the sheets 2-millimeter-plates were pressed from which test specimens were prepared.

---

[1] If, for instance, 50 grams of antimony pentasulfide are dispersed in 1.5 liters of water while introducing under stirring chlorine at a temperature of about 95° C., soon the colour of the antimony pentasulfide disappears. The fine white powder formed is filtered off with suction and washed with water; yield: 12 grams. This product, apparently a high molecular antimony oxychloride, that may be contaminated with a little elementary sulfur—the greatest part of the sulfur is present as sulfur ions in the filtrate—is very resistant against acids and alkalies. This substance is excellent as inert addition for the chlorination of polyethylene for the purpose of preventing too strong an agglomeration. In the instant example antimony pentasulfide was used, thus forming antimony oxychloride during the chlorination in situ. As a matter of fact this insert substance can be prepared previously and can then be added as such.

| Chlorinated polyethylene from example | Chlorine content [1] | Tensile strength, kg./cm.[2] DIN 53 371 | Elongation at break percent DIN 53 371 | Shorehardness A DIN 53 505 |
|---|---|---|---|---|
| 2 | 26.5 | 40 | 400 | 65 |
| 7 | 25.8 | 15 | 1,000 | 65 |
| 8 | 22.1 | 35 | 850 | 75 |
| 9 | 24.6 | 20 | 900 | 70 |
| 10 | 29.8 | 25 | 700 | 70 |
| 11 | 31.3 | 20 | 900 | 65 |
| 13 | 19.4 | 40 | 725 | 80 |
| 14 | 23.3 | 30 | 525 | 75 |
| 17 | 18.5 | 40 | 450 | 80 |
| 18 | 14.7 | 55 | 750 | 78 |
| 19 | 12.5 | 80 | 375 | 90 |
| 20 | 11.5 | 40 | 600 | 89 |
| 22 | 20.7 | 20 | 850 | 72 |
| 23 | 25.7 | 6 | 1,050 | 55 |
| 25 | 23.7 | 15 | 1,100 | 65 |
| 26 | 23.1 | 35 | 475 | 65 |
| 28 | 27.0 | 25 | 425 | 60 |
| 29 | 33.8 | 30 | 400 | 63 |
| 30 | 39.0 | 80 | 425 | 70 |
| 32 | 44.2 | 180 | 350 | [2]>100 |

[1] The chlorine content is calculated upon the total amount of the product, that is to say inclusive of the inert additive so that, referred to pure chlorinated polyethylene, the values would result to be somewhat higher.

[2] Shore D: 70.

We claim:

1. A process for the manufacture of a chlorinated polyethylene having rubber elastic properties and an improved solubility which comprises contacting a dispersion of (1) a finely divided solid material being inert to the chlorination reaction and (2) a finely divided high-pressure polyethylene having a molecular weight of from 10,000 to 50,000, in an aqueous medium with gaseous chlorine at a tempearture of at least 70° C.

2. Process of claim 1, wherein the chlorination temperature is at least 100° C.

3. Process of claim 1, wherein the chlorination temperature is at least 110° C.

4. Process of claim 1, wherein the dispersion is contacted with chlorine until the polyethylene is chlorinated to a chlorine content of 20 to 75% by weight.

5. Process of claim 1, wherein the chlorination is carried out in a first step at a tempearture below 110° C. and subsequently in a second step at a temperature above 110° C.

6. Process of claim 1, wherein the chlorine is under a pressure in the range between 0 and 20 atmospheres gauge.

7. Process of claim 1, wherein the chlorination is conducted under catalytic influence.

8. Process of claim 1, wherein the chlorination is conducted in the presence of an emulsifier.

9. Chlorinated high-pressure polyethylene having rubber elastic properties and an improved solubility obtained according to the process of claim 1.

10. A process for the manufacture of chlorinated polyethylenes having rubber-elastic properties and an improved solubility, which comprises dispersing a mixture of solid inert material and finely divided high-pressure polyethylene of a molecular weight of at least about 10,000 in an aqueous medium and chlorinating the polyethylene portion by the action of gaseous chlorine while applying a temperature during the reaction of at least 70° C. and at least in part a tempearture above 100° C.

11. The process of claim 10 wherein the chlorination at above 100° is initiated after the chlorine content of the polyethylene is about 42%.

References Cited by the Examiner

UNITED STATES PATENTS 2,592,763  4/1952  Taylor _____ 260—94.9
2,928,819  3/1960  Noeske _____ 260—94.9

FOREIGN PATENTS 828,938  2/1960  Great Britain.
843,209  4/1960  Great Britain.

JOSEPH L. SCHOFER, *Primary Examiner.*

E. M. OLSTEIN, L. EDELMAN, *Assistant Examiners.*